United States Patent
Sawaf et al.

(10) Patent No.: US 9,798,720 B2
(45) Date of Patent: Oct. 24, 2017

(54) HYBRID MACHINE TRANSLATION

(75) Inventors: Hassan Sawaf, Leesburg, VA (US); Mohammad Shihadah, McLean, VA (US); Mudar Yaghi, McLean, VA (US)

(73) Assignee: eBay Inc., San Jose, CA (US)

( * ) Notice: Subject to any disclaimer, the term of this patent is extended or adjusted under 35 U.S.C. 154(b) by 1413 days.

(21) Appl. No.: 12/606,110

(22) Filed: Oct. 26, 2009

(65) Prior Publication Data

US 2010/0179803 A1    Jul. 15, 2010

Related U.S. Application Data

(60) Provisional application No. 61/193,058, filed on Oct. 24, 2008.

(51) Int. Cl.
*G06F 17/28* (2006.01)

(52) U.S. Cl.
CPC .................... *G06F 17/28* (2013.01)

(58) Field of Classification Search
CPC ............ G06F 17/2827; G06F 17/2872; G06F 17/2818
USPC .................. 704/4, 5, 8, 9, 10, 266
See application file for complete search history.

(56) References Cited

U.S. PATENT DOCUMENTS

| | | |
|---|---|---|
| 5,477,450 A | 12/1995 | Takeda et al. |
| 5,912,986 A | 6/1999 | Shustorovich ............... 382/156 |
| 6,028,956 A | 2/2000 | Shustorovich et al. ...... 382/156 |
| 6,490,549 B1 * | 12/2002 | Ulicny .................. G06F 17/273 704/10 |
| 6,865,528 B1 * | 3/2005 | Huang et al. .................... 704/9 |

(Continued)

FOREIGN PATENT DOCUMENTS

| | | | | |
|---|---|---|---|---|
| EP | 1855211 A2 | 11/2007 | ............ | G06F 17/28 |
| EP | 1983445 A2 | 10/2008 | ............ | G06F 17/28 |

(Continued)

OTHER PUBLICATIONS

Hassan Sawaf et al., "On the Use of Grammar Based Language Models for Statistical Machine Translation", Nov. 5, 1999, pp. 1-13.*

(Continued)

*Primary Examiner* — Richemond Dorvil
*Assistant Examiner* — Mark Villena
(74) *Attorney, Agent, or Firm* — Schwegman Lundberg & Woessner, P.A.

(57) ABSTRACT

A system and method for hybrid machine translation approach is based on a statistical transfer approach using statistical and linguistic features. The system and method may be used to translate from one language into another. The system may include at least one database, a rule based translation module, a statistical translation module and a hybrid machine translation engine. The database(s) store source and target text and rule based language models and statistical language models. The rule based translation module translates source text based on the rule based language models. The statistical translation module translates source text based on the statistical language models. A hybrid machine translation engine, having a maximum entropy algorithm, is coupled to the rule based translation module and the statistical translation module and is capable of translating source text into target text based on the rule based and statistical language models.

11 Claims, 10 Drawing Sheets

(56) References Cited

U.S. PATENT DOCUMENTS

| | | |
|---|---|---|
| 7,269,598 B2 | 9/2007 | Marchisio |
| 7,610,189 B2 | 10/2009 | Mackie .............................. 704/9 |
| 7,716,039 B1 | 5/2010 | Bangalore et al. ................ 704/9 |
| 7,716,226 B2 | 5/2010 | Barney .......................... 707/748 |
| 7,805,289 B2 | 9/2010 | Zhou et al. |
| 8,285,536 B1 | 10/2012 | Kumar et al. |
| 8,386,477 B1 | 2/2013 | Murphy et al. |
| 8,463,810 B1 | 6/2013 | Rennison |
| 8,732,151 B2 | 5/2014 | Ali et al. |
| 8,930,176 B2 | 1/2015 | Li et al. |
| 9,053,202 B2 | 6/2015 | Viswanadha et al. |
| 9,342,503 B1 | 5/2016 | Evans et al. |
| 9,530,161 B2 | 12/2016 | Sawaf |
| 9,569,526 B2 | 2/2017 | Sawaf |
| 2001/0029455 A1 | 10/2001 | Chin et al. |
| 2002/0107683 A1 | 8/2002 | Eisele |
| 2002/0111789 A1 | 8/2002 | Hull |
| 2002/0198713 A1* | 12/2002 | Franz et al. ................... 704/252 |
| 2004/0029085 A1 | 2/2004 | Hu et al. |
| 2004/0181410 A1* | 9/2004 | Hwang .......................... 704/256 |
| 2004/0243645 A1 | 12/2004 | Broder et al. |
| 2005/0005237 A1 | 1/2005 | Rail et al. |
| 2005/0015217 A1 | 1/2005 | Weidl et al. .................. 702/185 |
| 2005/0228640 A1 | 10/2005 | Aue et al. .......................... 704/9 |
| 2005/0289168 A1 | 12/2005 | Green et al. |
| 2006/0142995 A1 | 6/2006 | Knight et al. ..................... 704/9 |
| 2006/0241869 A1 | 10/2006 | Schadt et al. .................. 702/19 |
| 2006/0271561 A1 | 11/2006 | Schlachta-Fairchild et al. |
| 2007/0038386 A1 | 2/2007 | Schadt et al. .................. 702/20 |
| 2007/0166707 A1 | 7/2007 | Schadt et al. ..................... 435/6 |
| 2007/0185946 A1 | 8/2007 | Basri et al. .................. 708/200 |
| 2007/0209075 A1 | 9/2007 | Coffman .......................... 726/23 |
| 2008/0025617 A1 | 1/2008 | Posse et al. ................. 382/224 |
| 2008/0040095 A1 | 2/2008 | Sinha et al. ...................... 704/2 |
| 2008/0077384 A1 | 3/2008 | Agapi et al. |
| 2008/0077391 A1* | 3/2008 | Chino et al. ...................... 704/7 |
| 2008/0114581 A1 | 5/2008 | Meir et al. ....................... 703/13 |
| 2008/0133245 A1 | 6/2008 | Proulx et al. ................. 704/277 |
| 2008/0133444 A1 | 6/2008 | Gao et al. |
| 2008/0154577 A1* | 6/2008 | Kim ................... G06F 17/2827 704/2 |
| 2008/0195372 A1 | 8/2008 | Chin et al. |
| 2008/0262826 A1 | 10/2008 | Pacull |
| 2008/0270109 A1 | 10/2008 | Och ................................ 704/2 |
| 2009/0018821 A1 | 1/2009 | Sadamasa et al. ................ 704/9 |
| 2009/0070099 A1 | 3/2009 | Anisimovich et al. ........... 704/5 |
| 2009/0083243 A1 | 3/2009 | Heymans et al. |
| 2009/0157380 A1 | 6/2009 | Kim et al. ........................ 704/4 |
| 2009/0265230 A1 | 10/2009 | Plachouras et al. ....... 705/14.54 |
| 2009/0265290 A1 | 10/2009 | Ciaramita et al. .............. 706/12 |
| 2010/0004919 A1 | 1/2010 | Macherey et al. ................ 704/4 |
| 2010/0004920 A1 | 1/2010 | Macherey et al. ................ 704/4 |
| 2010/0070521 A1 | 3/2010 | Clinchant et al. |
| 2010/0138211 A1 | 6/2010 | Shi et al. |
| 2010/0179803 A1 | 7/2010 | Sawaf et al. ...................... 704/2 |
| 2010/0180244 A1 | 7/2010 | Kalafala et al. ............. 716/103 |
| 2010/0280818 A1 | 11/2010 | Childers |
| 2011/0082683 A1 | 4/2011 | Soricut et al. |
| 2012/0016655 A1 | 1/2012 | Travieso et al. |
| 2012/0109623 A1 | 5/2012 | Dolan et al. |
| 2012/0141959 A1 | 6/2012 | von Ahn Arellano et al. |
| 2012/0158621 A1 | 6/2012 | Bennett et al. |
| 2012/0245924 A1 | 9/2012 | Brun |
| 2012/0278244 A1 | 11/2012 | Lee et al. |
| 2012/0330974 A1 | 12/2012 | Zillner |
| 2013/0030787 A1 | 1/2013 | Cancedda et al. |
| 2013/0030788 A1 | 1/2013 | Barbosa et al. |
| 2013/0110596 A1 | 5/2013 | Milone |
| 2013/0144594 A1 | 6/2013 | Bangalore et al. |
| 2014/0278346 A1 | 9/2014 | Zomet et al. |
| 2015/0248400 A1 | 9/2015 | Sawaf |
| 2015/0248401 A1 | 9/2015 | Ruvini et al. |
| 2017/0091176 A1 | 3/2017 | Sawaf |
| 2017/0154074 A1 | 6/2017 | Sawaf |

FOREIGN PATENT DOCUMENTS

| | | | | |
|---|---|---|---|---|
| EP | 2199925 A1 | 6/2010 | ............. | G06F 17/28 |
| JP | 8190562 A | 7/1996 | ............. | G06F 17/27 |
| JP | 2003030186 A | 1/2003 | ............. | G06F 17/22 |
| JP | 2004220266 A | 8/2004 | ............. | G06F 17/27 |
| JP | 2009075795 | 4/2009 | ............. | G06F 17/27 |
| JP | 2009294747 A | 12/2009 | ............. | G06F 17/28 |
| KR | 2010031800 A | 3/2010 | ............. | G06F 17/27 |
| WO | WO 2005/017652 A2 | 2/1950 | ............. | C12Q 1/68 |
| WO | WO-0175662 A2 | 10/2001 | | |
| WO | WO 03/042769 A1 | 5/2003 | ............. | G05B 23/02 |
| WO | WO 2004/061616 A2 | 7/2004 | ............. | G06F 19/00 |
| WO | WO 2005/081178 A1 | 9/2005 | ............. | G03B 19/18 |
| WO | WO 2005/096708 A2 | 10/2005 | ............. | G06F 17/28 |
| WO | WO 2006/042321 A2 | 4/2006 | ............. | G06F 17/28 |
| WO | WO 2008/019170 A2 | 2/2008 | ............. | G06F 11/00 |
| WO | WO 2009/038525 A1 | 3/2009 | ............. | G06Q 10/00 |
| WO | WO 2010/003117 A2 | 1/2010 | ............. | G06F 17/00 |
| WO | WO 2010/036311 A2 | 4/2010 | ............. | G01N 21/00 |
| WO | WO-2010046782 A3 | 4/2010 | | |
| WO | WO-2015130974 A1 | 9/2015 | | |
| WO | WO-2015130982 A1 | 9/2015 | | |
| WO | WO-2015130984 A2 | 9/2015 | | |
| WO | WO-2015130986 A1 | 9/2015 | | |

OTHER PUBLICATIONS

Franz Josef Och et a., "A Systematic Comparison of Various Statistical Alignment Models", 2003, Association for Computational Linguistics, pp. 19-51.*

"A Hybrid Approach to Chinese-English Machine Translation," by Ying, et al., 1997 IEEE International Conference on Intelligent Processing Systems (Oct. 2007).

"Hybrid Machine Translation: Combining Rule-Based and Statistical MT Systems," by Eisele, et al. (EuroMatrix, Apr. 2007).

"Rule Based Machine Translation Combined with Statistical Post Editor for Japanese to English Patent Translation," by Ehara Terumasa, Department of Electronic Systems Engineering, Tokyo University of Science, Japan (Sep. 2007).

"Hybrid Machine Translation Architectures within and beyond the EuroMatrix Project," by Eisele, et al., 12th EAMT Conference, Sep. 2008.

"Hybrid Machine Translation Applied to Media Monitoring," by Sawaf, et al., 8th AMTA Conference, Hawaii, Oct. 21-25, 2008.

International Search Report for Application No. PCT/IB2009/007438, dated Apr. 27, 2010.

García-Varea and Casacuberta (2005) in "*Maximum Entropy Modeling: A Suitable Framework to Learn Context-Dependent Lexicon Models for Statistical Machine Translation*".

International Search Report dated Apr. 27, 2010.

Sawaf, Hassan, "The AppTek MT System for the NIST Evaluation 2006—Hybrid Machine Translation for Broadcast, News, Dialect and Conversational Input in Arabic," AppTek Applications Technology, Inc., 11 pp., Sep. 7, 2006.

"International Application Serial No. PCT/IB2009/007438, International Preliminary Report on Patentability dated May 5, 2011", 7 pgs.

"International Application Serial No. PCT/IB2009/007438, Written Opinion dated Apr. 27, 2010", 5 pgs.

"International Application Serial No. PCT/US2015/017833, International Search Report dated Jul. 1, 2015", 2 pgs.

"International Application Serial No. PCT/US2015/017833, Written Opinion dated Jul. 1, 2015", 4 pgs.

"International Application Serial No. PCT/US2015/017842, International Search Report dated Jun. 3, 2015", 2 pgs.

"International Application Serial No. PCT/US2015/017842, Written Opinion dated Jun. 3, 2015", 6 pgs.

"International Application Serial No. PCT/US2015/017845, International Search Report dated Jun. 19, 2015", 2 pgs.

"International Application Serial No. PCT/US2015/017845, Written Opinion dated Jun. 19, 2015", 5 pgs.

Sawaf, Hassan, et al., "On the Use of Grammar Based Language Models for Statistical Machine Translation", (Nov. 5, 1999), 1-13.

(56) References Cited

OTHER PUBLICATIONS

"U.S. Appl. No. 14/194,582, Examiner Interview Summary dated Jun. 7, 2016", 3 pgs.
"U.S. Appl. No. 14/194,582, Response filed Jun. 29, 2016 to Non Final Office Action dated Mar. 30, 2016", 16 pgs.
"U.S. Appl. No. 14/194,606, Final Office Action dated May 4, 2016", 12 pgs.
"U.S. Appl. No. 14/194,582, Notice of Allowance dated Oct. 5, 2016", 11 pgs.
"U.S. Appl. No. 14/194,606, Notice of Allowance dated Aug. 17, 2016", 10 pgs.
"U.S. Appl. No. 14/194,606, Response filed Jul. 26, 2016 to Final Office Action dated May 4, 2016", 20 pgs.
"U.S. Appl. No. 14/194,606, Supplemental Amendment dated Jul. 27, 2016", 3 pgs.
"International Application Serial No. PCT/US2015/017845, International Preliminary Report on Patentability dated Sep. 15, 2016", 7 pgs.
"U.S. Appl. No. 14/194,606, Non Final Office Action dated Oct. 2, 2015", 11 pgs.
"International Application Serial No. PCT/US2015/017848, International Search Report dated Jun. 8, 2015", 2 pgs.
"International Application Serial No. PCT/US2015/017848, Written Opinion dated Jun. 8, 2015", 6 pgs.
"U.S. Appl. No. 14/194,582, Non Final Office Action dated Mar. 30, 2016", 25 pgs.
"U.S. Appl. No. 14/194,606, Response filed Feb. 2, 2016 to Non Final Office Action dated Oct. 2, 2015", 11 pgs.
"U.S. Appl. No. 15/377;602, Preliminary Amendment filed Dec. 27, 2016" 7 pgs.
"U.S. Appl. No. 15/430,773, Final Office Action dated May 15, 2017", 10 pgs.
"U.S. Appl. No. 15/377,602, Notice of Allowance dated Jun. 30, 2017", 14 pgs.
"U.S. Appl. No. 15/430,773, Response filed Aug. 15, 2017 to Final Office Action dated May 15, 2017", 13 pgs.

\* cited by examiner

Translation Training Process

HYBRID MACHINE TRANSLATION

CROSS-REFERENCE TO PENDING APPLICATION

This application claims priority to U.S. Provisional Application No. 61/193,058 filed on Oct. 24, 2008, entitled "HYBRID MACHINE TRANSLATION" by Hassan Sawaf, et al.

BACKGROUND OF THE INVENTION

An alternative to human translation of expression from one language into another, machine translation has been applied to increase translation throughput. In this regard, computing power has advanced exponentially over the past three decades to the point where intelligence analysts and linguists now can use powerful tools to assist them in processing large volumes of disparate data from multiple sources in real time. Machine translation (MT) is a software-based technology that can aid linguists and analysts in processing the volumes of incoming information whether from print, electronic, audio and video sources. There are two distinct methods for machine translation, rule-based and statistical. Each one has its advantages, but no product exists that combines the best of both worlds for a hybrid machine translation solution.

In this application, we describe a hybrid machine translation system, based on a statistical transfer approach using statistical and linguistic features and highlight the system's capabilities on applications of o machine translation in different tasks:

(a) Translation of one language into another for very large vocabulary broadcast, newswire and web texts. Their input is either captured from the Internet or is recorded form a satellite feed and recognized using a speech recognition system; and (b) Translation of one Language into another for medium to large vocabulary speech-to-speech translation. The input is recorded through a telephone channel and recognized using an automatic speech recognition system.

The recognized utterances and the text captured from the internet are normalized, using statistical machine translation that is based on finite state automata. The output of this interlingua is then translated by a hybrid machine translation system, combining statistical and rule-based features. This application introduces also a hybrid interlingua approach that gives better results for dialect speech input compared to a direct machine translation system based on a statistical approach and a direct machine translation based on a rule-based approach.

Applying Machine Translation

The current process for handling information is largely a manual one. Intelligence operations are highly reliant on the skills of the people performing foreign language translations and on those analyzing and interpreting the data while the volume of data grows exponentially and the pool of qualified people continues to shrink. Machine translation tools exist to assist linguists and analysts in doing their job.

What is Machine Translation?

Machine translation (MT) involves the use of computer software to translate one natural human language into another. MT takes into account the grammatical structure of each language, and uses contextual rules to select among multiple meanings, in order to transfer sentences from the source language (to be translated) into the target language (translated).

MT refers to the process of translating a variety of media (speech, text, audio/video, web pages, etc.) from one language to another using computers and software. MT is designed to support and assist intelligence analysts and linguists with their human translation tasks.

Translation, in its simplest definition, involves: decoding the meaning of the source text; and re-encoding this meaning in the target language. A translator decodes the meaning of the source text in its entirety. This means that the translator must interpret and analyze all the features of the text by applying in-depth knowledge of the grammar, semantics, syntax, idioms, and the like of the source language, as well as the culture of its speakers. At the same time, the translator needs an equivalent in-depth knowledge to re-encode the meaning in the target language.

Foreign language translation can be difficult even for a skilled linguist. Performing the same translations using machine translation increases the accuracy and speed of translating text and identifying key points of interest. The question is: How do you program a computer to "understand" a text just as a person does, and also to "create" a new text in the target language that "sounds" as if it has been written by a person? Machine translation software is designed to address this problem through two main approaches: a rules-based approach, and a statistical approach.

Rule-Based Machine Translation

A rules-based approach is a method based on linguistic rules meaning that words will be translated in a linguistic way, that is, the most suitable (orally speaking) words of the target language will replace the ones in the source language.

Generally, rule-based methods parse a text, usually creating an intermediary, symbolic representation, from which the text in the target language is generated. These methods require extensive lexicons with morphological, syntactic, and semantic information, and large sets of rules.

With sufficient data, MT programs often work well enough for a native speaker of one language to get the approximate meaning of what is written by the other native speaker. The difficulty is getting enough data of the right kind to support the particular method.

Rule-based translation approaches have the advantage of a high abstraction level, and allow understandable translations for a high coverage, i.e., the "informativeness" (the accurate translation of information) of the translation is higher for a higher coverage of domains and types of texts.

A prime motivation for creating a hybrid machine translation system is to take advantage of the strengths of both rule-based and statistical approaches, while mitigating their weaknesses. Thus, for example, a rule that covers a rare word combination or construction should take precedence over statistics that were derived from sparse data (and therefore is not very reliable). Additionally, rules covering long-distance dependencies and embedded structures should be weighted favorably, since these constructions are more difficult to process in statistical machine translation.

Statistical Machine Translation

Statistical machine translation tries to generate translations using statistical methods based on a large body of bilingual text. Such an example is the Canadian Hansard corpus, the English-French record of the Canadian parliament. Ambiguity of some words can change the meaning and subsequent translation. Today, both "shallow" and "deep" approaches are used to overcome this problem. Shallow approaches assume no knowledge of the text; they simply apply statistical methods to the words surrounding the ambiguous word. Deep approaches presume a comprehensive knowledge of the word. Thus, a statistical approach should take precedence in situations where large numbers of relevant dependencies are available, novel input is encountered or high-frequency word combinations occur.

Today, no single system provides a "fully-automatic, high-quality machine translation." Rule based machine translation applications have come the closest so far, however, there are some advantages of statistical machine translation that are not fully realized in pure rule based machine translation systems.

Accordingly, there remains a need for an optimal machine translation system. There is a further need for systems to perform translation using the best available models for translation of given source and target languages.

SUMMARY OF THE INVENTION

According to the present invention, a system and method for hybrid machine translation approach is based on a statistical transfer approach using statistical and linguistic features. The system and method may be used to translate from one language into another, for example: (i) translation of Modern Standard and "Slightly Dialectal" Arabic into English, for very large vocabulary Broadcast, Newswire and Web texts; and (ii) Iraqi and Modern Standard Arabic into English, for medium to large vocabulary speech-to-speech translation. The systems and methods use a workflow that incorporates technology to facilitate the processing of collected materials and, therefore, allow linguists and analysts to make more accurate decisions faster about what information is a potentially valuable asset to analyze and provide more accurate language translations of text and recognized speech inputs.

According to one embodiment of the invention, a system for automatic translation comprises at least one database, a rule based translation module, a statistical translation module and a hybrid machine translation engine. The database(s) store source and target text and rule based language models and statistical language models. The a rule based translation module translates source text based on the rule based language models. The statistical translation module translates source text based on the statistical language models. In addition, a hybrid machine translation engine, having a maximum entropy algorithm, is coupled to the rule based translation module and the statistical translation module and is capable of translating source text into target text based on the rule based and statistical language models.

The maximum entropy algorithm of the hybrid machine translation engine may be configured to assign probabilities to different statistical language models and different rule based models. In addition, the hybrid machine translation engine may be configured to perform translation of source text into target text based on available rule based and/or statistical language models.

According to additional embodiments of the invention, the database may further store directed acyclic graphs (DAGS) used by both the rule based and statistical translation systems and the rule based translation module may include semantic rules that are used to annotate the statistical DAGS. The rule based translation module may include rule based syntactic, semantic, and grammatical language models and a transfer system model. By contrast, the statistical translation module may include a statistical lexicon model, a statistical phrase model and a statistical language model. At least one of the syntactic, semantic and grammatical based models may be used to eliminate paths from a DAGS used by the hybrid machine translation engine.

According to another embodiment of the invention, a system for automatic translation of source text into target text, may comprise at least one database for storing source and target text and directed acyclic graphs (DAGS) and semantic rules. It may further include a statistical translation system that generates DAGS based on source text and a hybrid machine translation engine that annotates the DAGS based on semantic rules and translates source text into target text based on at least the DAGS. The hybrid machine translation engine may use a maximum entropy algorithm to perform the translation.

According to still another embodiment of the invention, a method for machine translation comprises receiving and storing source text, generating directed acyclic graphs (DAGS) based on statistical models, annotating the DAGS based on semantic rules and translating the source text into target text based at least in part on the annotated DAGS. The translating may be performed based on a maximum entropy algorithm that further receives weighted inputs from statistical and rule based translation system models and performs the translating based on the weighted inputs.

BRIEF DESCRIPTION OF THE FIGURES

The above described features and advantages of the present invention will be more fully appreciated with reference to the detailed description and accompanying drawing figures.

DETAILED DESCRIPTION

Approaches to Machine Translation

Machine Translation can be done in different manners, which can be roughly put in two categories: corpus-based methods and rule-based methods. Both approaches have advantages and disadvantages:

Corpus-based methods—namely example-based and statistical methods—are very fast to develop and they are very consistent, as they use examples to learn from, the disadvantage is that the approach needs a certain amount of data to extract the necessary information from the examples and the translation is only then of high quality, as long as the sentences are of the same domain and similar type as the sentences in the training data, i.e. they show high grades of "fluency".

Rule-based translation approaches have the advantage, that they have a high abstraction level, and allow understandable translations for a high coverage, i.e. the "informativeness" of the translation is higher for a higher coverage of domains and types of texts.

To combine the qualities of both approaches, a hybrid machine translation approach as described herein may be used. The use of parsing features in machine translation showed a quality boost in the past, as can be read in (Sawaf et al. 2000). But beyond the use of syntax-based language models, we want to use more linguistic information in the machine translation. Our approach is based on the mathematical basis of corpus-based approaches, namely the statistical approach described in (Ney et al. 2000).

Figure 1:
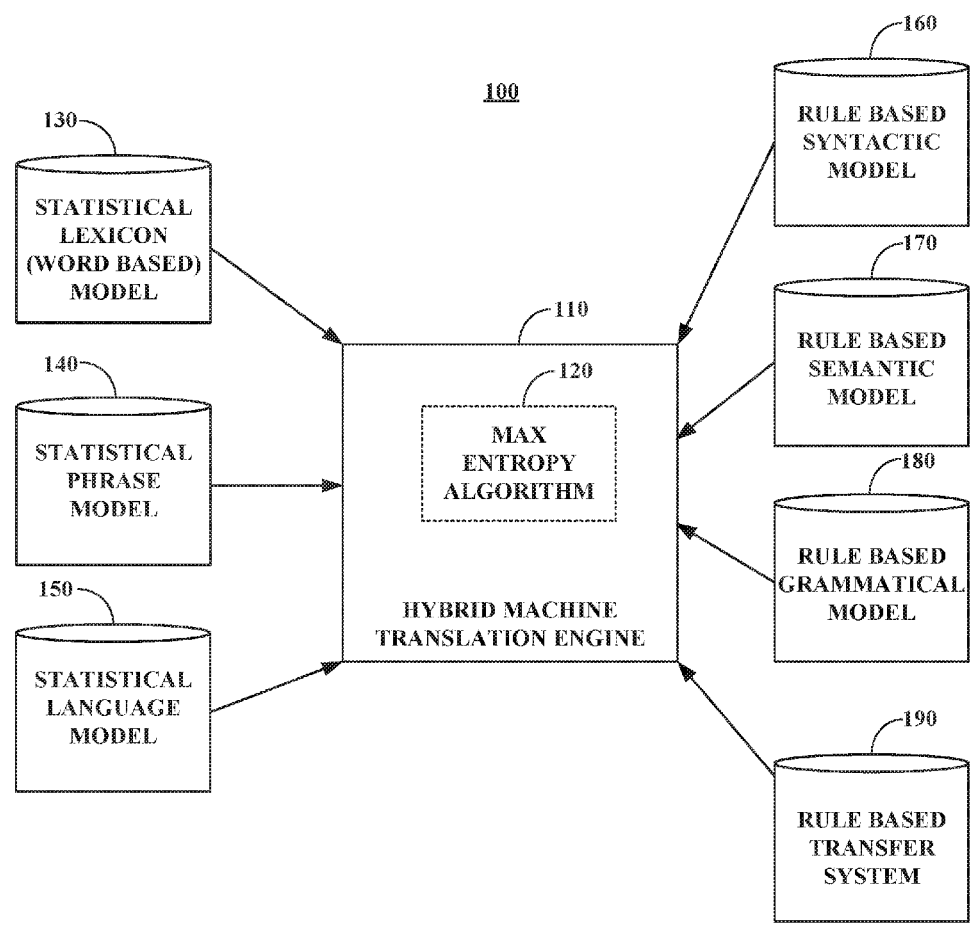
FIG. 1 depicts a hybrid machine translation system according to one embodiment of the present invention.

FIG. 1 shows the use of a hybrid machine translation engine 100 which makes use of a maximum entropy algorithm 120 implemented by a hybrid machine translation engine 100 and inputs from statistical and rule based models. The statistical inputs include, for example, a statistical lexicon model 130, a statistical phrase model 140 and a statistical language model 150. The rule based inputs include, for example, a rule based syntactic model 160, a rule based syntactic model 170, a rule based grammatical model 180 and a rule based transfer system 190. The output of each of the models may be weighted and the maximum entropy algorithm may take into account these weights when selecting the optimum translation.

Figure 2A:
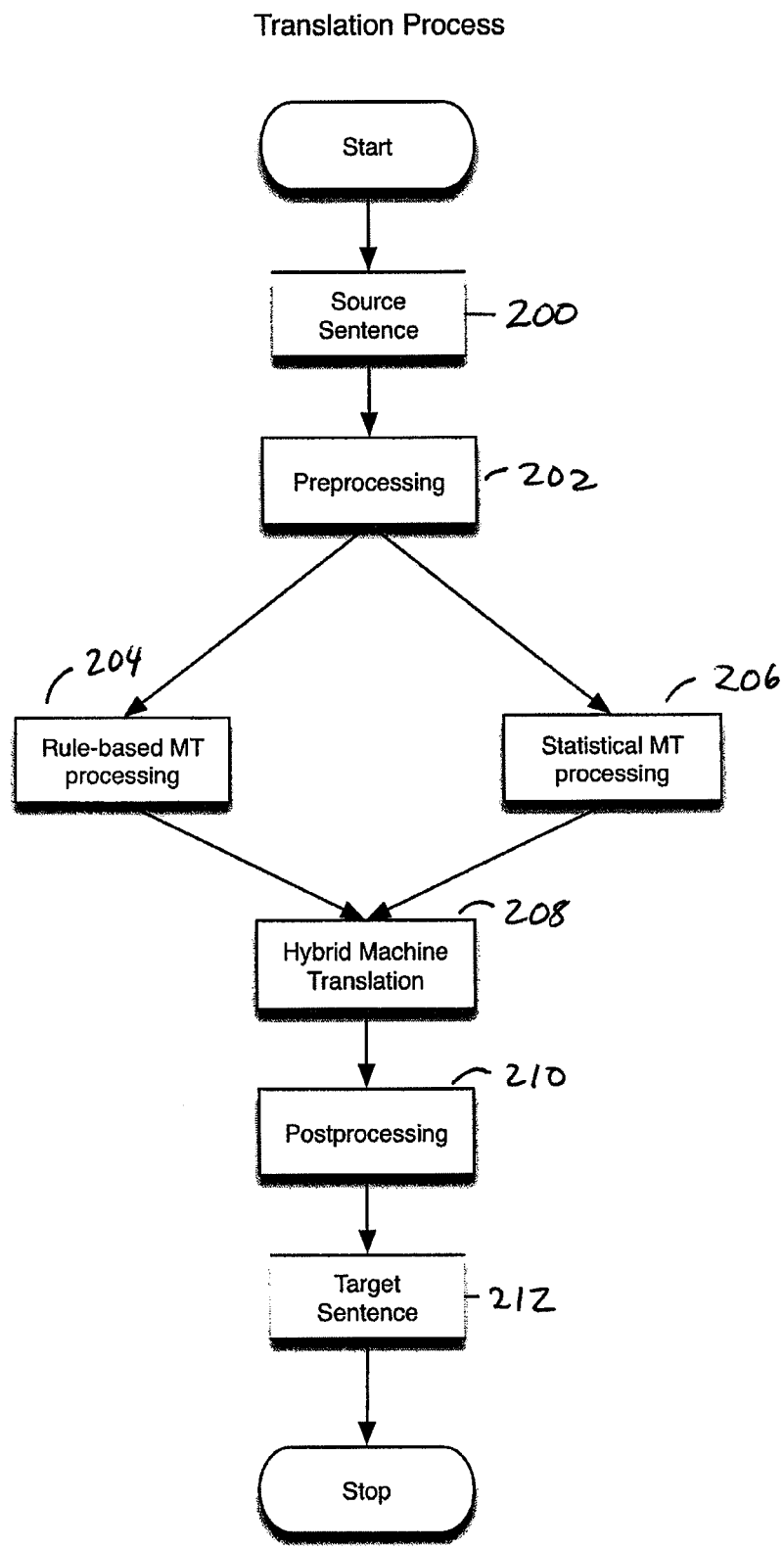
FIGS. 2A-2C depict flow charts of a hybrid machine translation and training process according to an embodiment of the present invention.

FIG. 2A depicts a translation process. Referring to FIG. 2A, in step 200, a source sentence enters the translation process and generally a computer system for performing the translation process. The sentence may be a single text input sentence, a single transcription utterance, a n-best text input in list form, a n-best text input in DAG form, a n-best transcription in list form, a n-best transcription in DAG form or any other source of text. Text transcription may be input from a speech recognition process, a character recognition process or other process of transcribing text. The text may be stored in memory for processing.

Figure 2B:
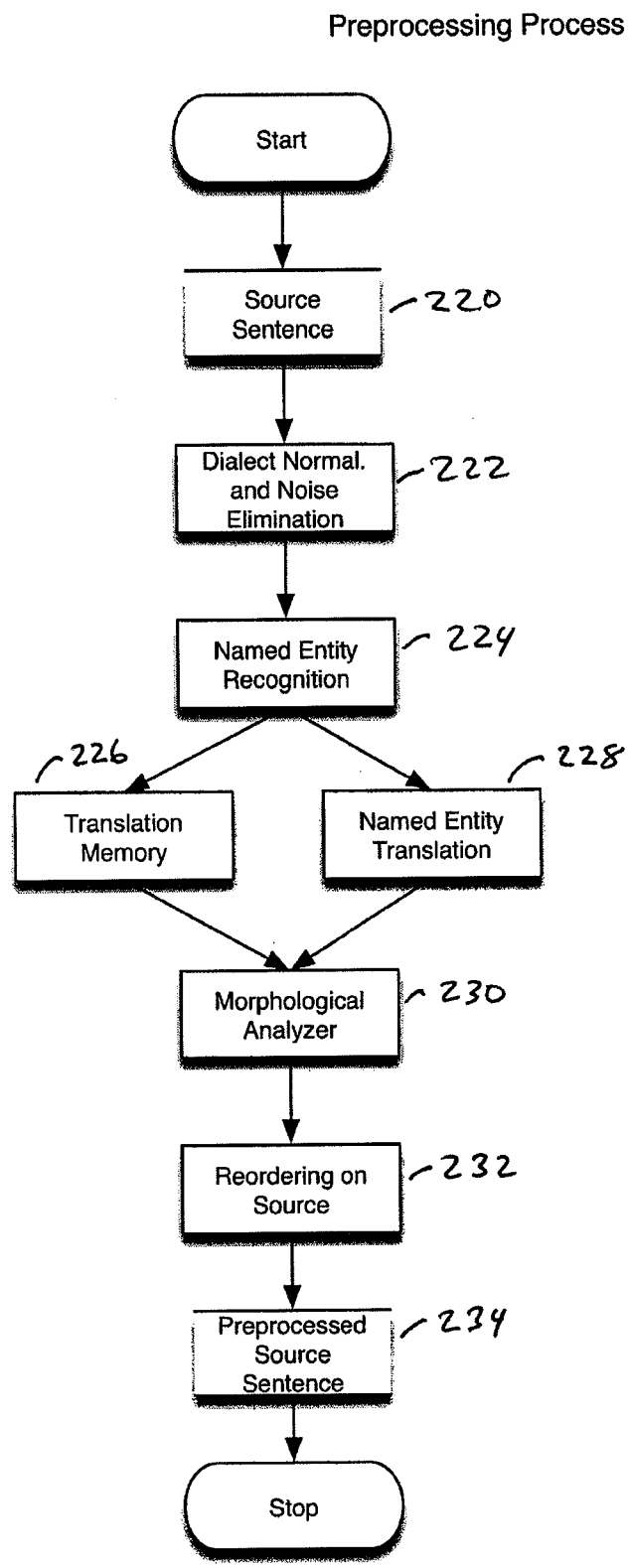

In step 202, the computer preprocesses the text. The preprocessing process is shown in FIG. 2B. The out put of the preprocessing process is may be sent for rule based machine translation processing in step 204 and statistical machine translation processing in step 206. In step 208, a hybrid machine translation processes receives inputs from the rule-based machine translation 204 and statistical machine translation processing 206 and outputs translation information to step 210. In step 210, the computer performs postprocessing and outputs in step 212 the output of the translation process. The output may be one or more translated sentences, including, for example, one best hypothesis, n-best hypotheses in list form or n-best hypotheses in DAG form.

FIG. 2B shows a preprocessing process according to an embodiment of the invention. Referring to FIG. 2B, in step 222 a dialect normalization and noise elimination step receives a source sentence, for example from the translation process shown in FIG. 2A. In step 224, a computer performs named entity recognition on the source text. Then in step 226, information from steps 220-224 are stored in memory in step 226 for translation and in step 228, translation of named entities is performed with resulting information being saved in memory.

In step 230, a morphological analyzer analyzes the information stored in memory and in step 232 reordering is done on the source sentence. In step 234, the preprocessed source sentence is available for the translation processes shown in FIG. 2A and other translation processes shown and described herein.

Figure 2C:
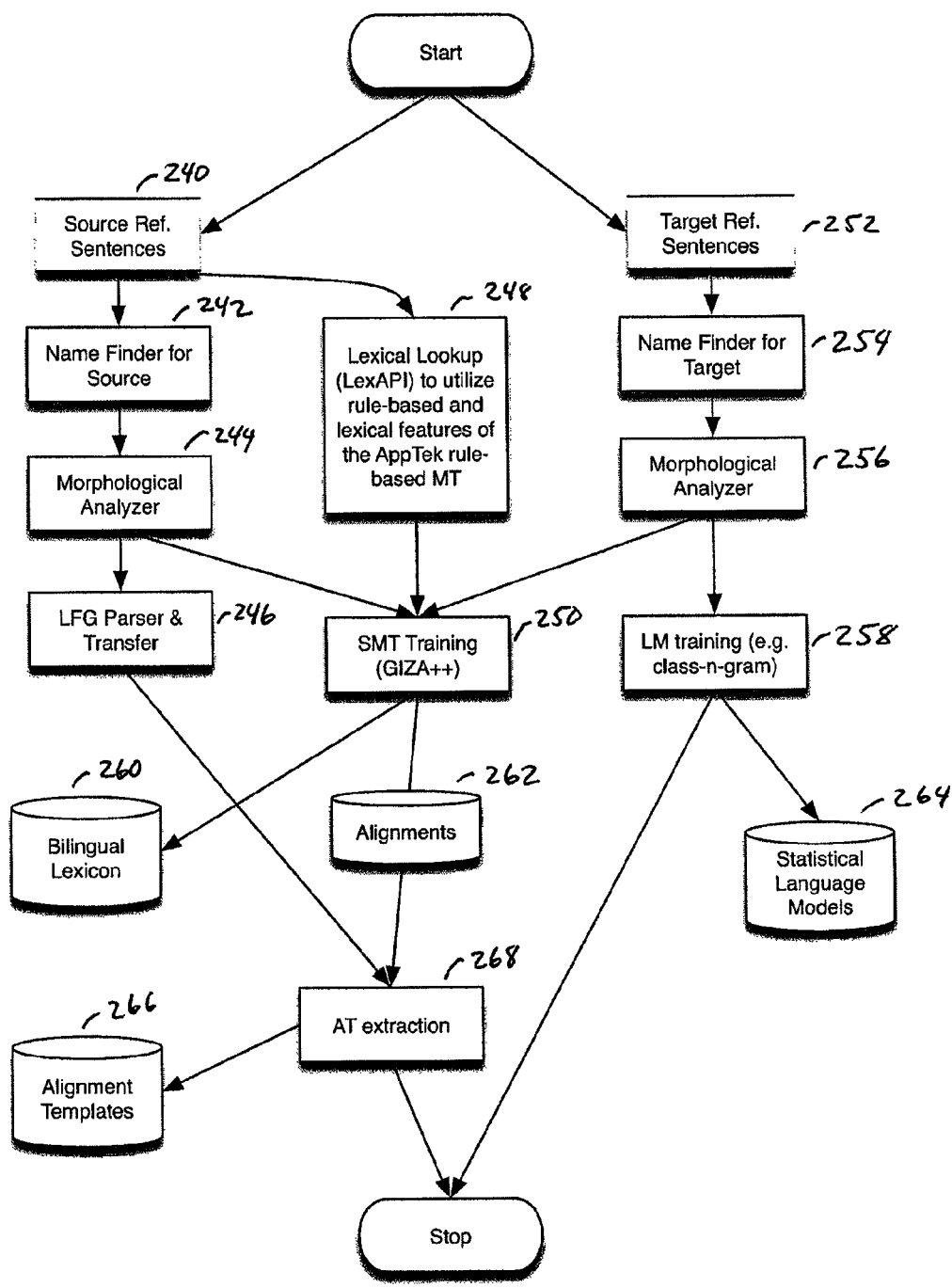
Figure 3:
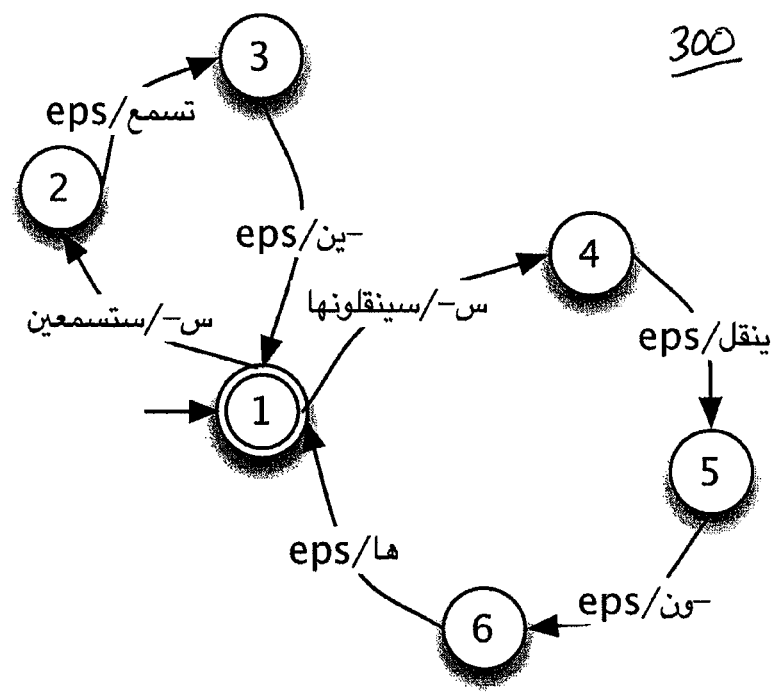
FIG. 3 depicts a word graph.

FIG. 2C depicts a translation training process according to an embodiment of the present invention. Referring to FIG. 2C, in step 240 source reference sentences are input to the training process. In step 242, a name finder is applied to the source, followed by a morphological analyzer in step 244. In step 246 a LFG parser and transfer process is applied, the output of which is sent to the AT extraction process 268. In step 248, a lexical lookup is used to utilize rule-based and lexical features of rule based machine translation. In step 252, target reference sentences are input that correspond to the source reference sentences. A name finder for the target is applied in step 256 and then a morphological analyzer processes the target text. In step 258, the text from the morphological analyzer is input to a LM training process, which further outputs data to a statistical language models database 264.

In step 250, a SMT training process, for example (GIZA++) receives inputs from processes 244, 248 and 256 and is used to generate a bilingual lexicon database 260 and an alignments database 262. In step 268 an alignment template extraction step is performed an alignment templates database is created in step 266. In this manner, various databases may be created through a training process that involves inputting source and target reference text and analyzing the source and reference text statistically and according to rule based translation to populate databases that are used by a hybrid matching translation database to perform machine translation.

Following is a more detailed discussion of certain terms and steps that appear in FIGS. 2A-2C and their application to hybrid machine translation.

Hybrid Machine Translation

The approach of the hybrid machine translation system according to one embodiment of the invention is based on the mathematical definition of machine translation—the implementation is based on cascaded finite-state automaton (FSA) as are used for Speech Recognition and Machine Translation and other human language technology applications. We refer to the approach as "stacked FSA MT approach". The use of probabilistic FSAs for hybrid machine translation allows us to easily combine syntactical and other linguistically motivated features with statistical machine translation features and algorithms.

Dialect Normalization and Noise Elimination

To translate documents from the Internet, e.g. "Blogs" or emails, the need for noise reduction by normalization is of very high importance. The process is basically a monotone translation, allowing also phrases to be translated, so that special email jargon can be translated to standard text, as well as misspellings can be corrected. For this, we can use a standard statistical approach, and the use of a strong background lexicon to achieve good results in the spell-checking. The same process, with the same techniques can be used to do dialect normalization. The Arabic dialects are translated into Modern Standard Arabic. Currently, we distinguish 16 different main Arabic dialects: Modern Standard Arabic and colloquial Arabic dialects from the following regions: Lebanon, North Syria, Damascus, Palestine, Jordan, North Iraq, Baghdad, South Iraq, Gulf, Saudi-Arabia, South Arabic Peninsula, Egypt, Libya, Morocco, Tunisia. There is no limit to the number of dialects that may be used. Transferring the words from the dialects to Modern Standard Arabic can be seen as a Interlingua approach for dialect normalization.

Named Entity Recognition/Translation

To increase quality of the MT output, words which describe names, locations, events, dates, etc. (so-called "Named Entities") should be handled differently than other words. Many times, Named Entities can also be categorized as adjectives or regular nouns, like "كريم", which is a male's first name "Kareem" (potentially also a last name) or an adjective "generous", and of course, the translation of the word depends heavily on this categorization. Depending on the context, it can be determined, whether it is a Named Entity or not.

For this categorization, the following approach is used: In general, the decision is a search problem, which according to Bender et all (2003) can be described as:

$$P\lambda_1^M(c_n \mid c_{n-2}^{n-1}, w_{n-2}^{n+2}) = \frac{\exp\left[\sum_{m=1}^{M} \lambda_m h_m(c_{n-2}^{n-1}, c_n, w_{n-2}^{n+2})\right]}{\sum_{c'} \exp\left[\sum_{m=1}^{M} \lambda_m h_m(c_{n-2}^{n-1}, c', w_{n-2}^{n+2})\right]}. \quad (1.2)$$

(●) deleting so-called feature-functions, which are either linguistic, lexical, morphological or statistically learned phenomena. An example of such feature is the fact that a word like "the doctor" (in Arabic "الدكتور") indicates that the following word is most probably a name, if it is not a verb. An overview of some of the features can be seen in the following table:

TABLE 1

Some feature types as described in Bender et al. (2003)

| FEATURE TYPE | DESCRIPTION |
| --- | --- |
| Lexical | words are in a fixed lexicon |
| Word | digits and numbers: date and time |
| Transition | distribution depending on predecessor words |
| Compound | distribution depending whether the word is part of a compound or not |
| Signal Word | signal words from a signal word lexicon could trigger, if in a specific proximity |

The translation of a Named Entity may be dealt with differently than other words. Named Entities have three different ways of translation:

Translate the Named Entity by translating the linguistic (sub-)entities: e.g. "وزارة الخارجية" into "Ministry of Foreign Affairs";

Translate the Named Entity by using a previously seen transcription into the target language alphabet. Previously seen means seen in bilingual training data. E.g. "أحمد" into "Ahmad";

Translate the Named Entity by using an automatic transcription approach, using a phonetic mapping of the source language graphemes into source language phonemes, then mapping the source language phonemes into target language phonemes, then finally converting these target language phonemes into the target language graphemes, which are the sub-units of the word (for Arabic, similar to many European languages, the graphemes are mainly the "letters" of the alphabet).

Morphological Analysis

In statistical analysis, the number of occurrences of words and the number of unique words in different environments is taken into account for the statistical models (to prevent the "sparse data problem", meaning that phenomena—also called "events"—occur only sparsely and the statistics gathered around it is not sufficient to have a reliable modeling) as well as speed (smaller translation lexicon means fewer possible translations and fewer transactions to reach a translation). So, to deal with this class of problems, morphological analysis can be considered.

For languages like English, morphological analysis has only a minor role for decreasing the number of events for the modeling for syntactical analysis and/or generation. Other languages like French and Spanish have a higher morphological complexity, and the use of morphological analysis decreases the vocabulary size by about 10-20%. For a language like German, where the morphology analysis helps deal with the well-known compound word problem, the vocabulary size can go down by 15-35%.

For languages like Arabic, morphology plays a very big role. For tasks like the GALE task, with a original vocabulary size of about 400K words, the morphology can decrease the value by up to 70%, down to 120K morphemes. Table 1 shows examples of morphological analyses of different words.

TABLE 1

Morphology examples for Arabic words

| Full-form Word | Morphemes | Meaning |
| --- | --- | --- |
| سينقلونها | س ينقل ون ها | (they) will move her |
| ستسمعين | س تسمع ين | (to female:) you will hear |
| سياراتهم | سيارات هم | their cars |

Morphological analysis can be also done based on FSA technology. Linguistic rules can be mostly easily rewritten as FSA rules, allowing an algorithm like the Expectation Maximization algorithm to assign weights to these rules. To allow higher precision for the final translation, the Morphology Analyzer FSA allows to generate multiple hypotheses, leaving the final decision of morphological analysis to a later step. The step of morphological analysis includes also Parts-of-speech tagging, as it is part of the decision for the morphological categories. An example (sub-) FSA for two words out of the examples in Table 2 can be seen in schematics FIG. 4.

The syntactic component contains rules annotated with functional expressions and used to build c-structures (hierarchical constituent structures) and their associated f-structures (functional structures) for a sentence.

Whenever a rule succeeds, a new edge may be formed; the DAG associated with the new complete edge generally contains a CAT (category) label, and an FS (functional structure) label, the value of which will be the unification of the FS labels of the categories that matched in the rule, projected to the functions specified in the rule pattern.

| Source Sentence | Generated Translation |
| --- | --- |
| سينقلون سياراتهم | They will move their cars |

Constituent Structure

{SBAR
³{BOSS
³{VP
³ ³{VBAR
³ ³ ³{v سينقلون
³ ³ ³ ³{VSTEM
³ ³ ³ ³{mcTNPG
³ ³ ³ ³{mcVERB-PREFIX
³ ³{NP
³ ³ ³{NBAR
³ ³ ³ ³{N سيارات
³ ³ ³ ³ ³{NSTEM

-continued

```
3 3 3 3 3 {mcNUMBER
3 3 3 3 3 {mcPRON
3 {EOSS
```

Functional Structure

```
1
1FS [
1 1
1   1COMPID 103
1   1PRED # SUBJ OBJ1
1   1SUBJ [
1 1 1
1 1 1PERSON THIRD
1 1 1NUMBER PL
1 1 1GENDER MSC
1 1 1FORM PRODROP
1 1 1
1   1OBJ1 [
1 1 1
1 1 1CASE ACC
1 1 1DEFINITE PLUS
1 1 1POSS [
1 1 1 1
1 1 1 1PERSON THIRD
1 1 1 1NUMBER PL
1 1 1 1GENDER MSC
1 1 1 1DEFINITE PLUS
1 1 1 1APROFORMهم
1 1 1 1
1 1 1NUMBER PL
1 1 1MSALEM MINUS
1 1 1CONCRETE PLUS
1 1 1COUNT PLUS
1 1 1PROPER MINUS
1 1 1HUMAN MINUS
1 1 1ANIM MINUS
1 1 1GENDER FEM
1 1 1PERSON THIRD
1 1 1NCLASS NOUN
1 1 1FORMسيارة
1 1 1
1   1MOOD INDIC
1   1VOICE ACTIVE
1   1AAUXFORMسوف
1   1VPREFIX3 VP-S
1   1MODALITY # FUT
1   1GENDER MSC
1   1NUMBER PL
1   1PERSON THIRD
1   1TENSE PRES
1   1ASFGERUND PLUS
1   1VCLASS MAINV
1   1FORMنقل
1 1
1TNOD ANY
1CAT SBAR
1
```

Debug and Tracing Capabilities of the Parser:

a) Trace formation of incomplete edges (each one generates an anticipation for a category)

b) Trace formation of complete edges c) Access extended debugs or debug input, such as: Chart, Dictionary, complete edge, List, Morphology, Transfer dag, Quit d) Examine the current status of the chart: check what complete or incomplete edges have been formed at each position in the sentence e) Examine, and optionally save to a file, individual dictionary entries f) Examine, and optionally save to a file, a complete edge's c-structure and f-structure g) Display statistics for a complete edge (number, corresponding incomplete edge number, weight and rule that created it)

h) Print a detailed record of the chart operations i) Trace and debug the execution of morphology or syntax rules j) Examine and optionally save to a file a specified level of the transfer and generation DAGS Phrase-Chunking and In-Phrase Re-Ordering The purpose of phrase-chunking is to analyze a sentence and process the recognized phrases in such a way, that the following processes do not destroy the semantic value of the recognized phrase. Within this phrase, a local re-ordering of sub-units (Named entities, words, morphemes) can potentially help improve the translation quality.

For example, the (DET-ADJ-N) complex "the big man" in English can have a possible translation with a (DET-N-DET-ADJ) structure in Arabic "جل الـ الكبير", in morphemes "الرجل" الـ ر كبير", which are very local changes. Phrase-chunking uses linguistically-motivated and hand-crafted rules, as well as structures like statistical N-grams, combined in a statistical FSA, processing multiple hypotheses as an input and generating multiple potential hypotheses.

Re-Ordering of the Source Sentence

The next step of the translation process is a re-ordering process to make the input more homogeneous in comparison to the data that was used to train the statistical models of the following machine translation steps. To do so, the re-ordering of words is learned statistically by a learning algorithm, which evaluates an automatically generated alignment of a parallel corpus. The result of this algorithm is an FSA, which processes a graph of input tokens (Named Entities, phrases, words, morphemes) and reorders these according to the learned statistical criteria. Re-ordering is a domain specific process, that means for each new task and domain, the re-ordering can be different.

Basically, the first automaton of the core translation process is the translation FSA. For this automaton, the training of the statistical lexicon models is initialized using a hand-crafted set of lexical rules. These rules cover lexical information of each individual word as well as they also take some context into account. Naturally, the result of this FSA is not unique, no final decision on selection of words, meanings and translations is being done.

Transfer and Translation

The main process for the complete translation process is the transfer and translation FSA. For this automaton, the training of the statistical lexicon models is initialized using a hand-crafted set of lexical rules. These rules cover lexical information of each individual word as well as they also take some context into account. Naturally, the result of this FSA is not unique, no final decision on selection of words, meanings and translations is being done.

Re-Ordering of the Target Sentence

The next step of the translation process is another re-ordering. The goal is to find a word order which is homogenous to the data, which were used to train the statistical language model. To do so, again the re-ordering of words is learned statistically by a learning algorithm, which evaluates the order of the language model corpus. The result of this algorithm is an FSA, which processes a graph of input tokens (Named Entities, phrases, words, morphemes) and reorders these according to the learned statistical criteria. Also here, the re-ordering is a domain specific process, that means for each new task and domain, the re-ordering can be different and needs to be developed specific to the task.

Language Model Re-Scoring

The last step in the process is to select the best translation of the generated graph, calculating the weights and scores of each of the previous processing steps and combining these scores with the language model score. The language model score results off of a combination of different sub-language models, namely n-gram as well as grammatical parsers, as well as gap-n-gram language models. The combination is learned using a maximum entropy approach.

As (Och & Ney, 2004) described, if used in a Maximum Entropy framework, by using:

$$Pr(e \mid f) = p_{l_{1...M}}(e \mid f)$$

$$= \frac{\exp\left(\sum_{m=1}^{M} l_m h_m(e, f)\right)}{\sum_{e} \exp\left(\sum_{m=1}^{M} l_m h_m(e, f)\right)};$$

The lexical entries can be described as follows:

$$h_{TM_x}(f, e) = \left(\sum_{j=1}^{J} \delta(f_j, f)\right) \cdot \left(\sum_{i=1}^{I} \delta(e_i, e)\right)$$

where the statistically learned lexical entries are in the feature function $h_{TM_s}$ (f,e), manually generated lexical rules are in the feature function $h_{TM_r}$ (f,e).

The lexical entries can be described as follows:

$$h_{LM_x}(e) = \sum_{i=1}^{I} h_{LM_x}(e_i)$$

The use of functional constraints for lexical information in source and target give a deeper syntactic and semantic analytic value to the translation. Functional constraints are multiple, and some of these functions are language dependent (e.g. gender, polarity, mood, etc.). The use of these functional constraints can be denoted as: $h_{F\,M_x}(f,e)=z_x(f,e)$; where the functions in use are denoted by z(.). Some of these functions are sentence related, so the functional feature can be defined as: $h_{FM_x}(f,e)=\delta(z(f),z(e))$; but most functional relations are word based.

These functions can be cross-language or within a certain language. A cross-language function could be the tense information but also the function "human", describing that the concept to be generally a human being ("man", "woman", "president" are generally "human", but also potentially concepts like "manager", "caller", "driver", depending on the semantic and syntactic environment). Such a functional feature can be mathematically defined in the following way:

$$h_{FM_x}(f, e) = \sum_{j=1}^{J} \delta(z(f_j), z(f)) \cdot \sum_{i=1}^{I} \delta(z(e_i), z(e))$$

A "within-language" function could be gender, as objects can have different genders in different languages (e.g., for the translation equivalents of "table". "table" in English has no gender, "Tisch" is German is masculine, "table" in French is feminine). The following is an example, which affects only the generation of the target language:

$$h_{FM_x}(f, e) = \sum_{j=1}^{J} \sum_{k=j}^{J} \delta(z(e_j), z(e_k))$$

Speech Input Processing

The translation search is a function, which takes the output of all the above mentioned models and takes the probability of the different subtopics and calculates the path of the best hypothesis, traversing through the sub-FSAs described in the previous chapter.

Combining speech recognition output with machine translation is relatively straightforward. Speech recognition output for machine translation can be coded in word lattices to allow for multiple hypotheses (Vogel et al. 2000, Khadivi et al. 2006). Using FSAs allow for graphs (word lattices or confusion networks) to be an input instead of single-best word sequences, so that potential errors can be recovered. This is the case, as the speech recognition error rate on the first-best result is in general worse than the result encoded in a word lattice, which is a very efficient way to save a n-best list of hypotheses.

Component Integration and Optimization

The weight of each of the different components which were described in this chapter are being learned using the Minimum-Error rate-Training (MET). The sub-language models are dealt with as own units in the MET and optimized on this level.

TABLE 2

Corpus statistics about the Iraqi Colloquial Arabic and Arabic Broadcast News

| | ICA (Telephone) | MSA (Broadcast/News) |
|---|---|---|
| Vocabulary (full-form) | 65,000 | 400,000 |
| Running parallel text | 500,000 | 260,000,000 |
| Running monolingual text | 4,000,000 | 5,000,000,000 |
| Running target text | 4,800,000 | 8,000,000,000 |
| OOV Rate | 1% | <0.1% |

Customization and Domain-Adaptation

To increase quality of the hybrid machine translation, similar to purely statistical machine translation systems, most components can be adapted to new environments, either by using monolingual data (for language mode training), bilingual data (for lexicon models, alignment models and alignment templates) as well as linguistic information, like lexical and functional lexicons, syntactic rules for parsing and/or transfer.

Statistical MT Module

Statistical Machine Translation (SMT) systems have the advantage of being able to learn translations of phrases, not just individual words, which permits them to improve the functionality of both example-based approaches and translation memory. Another advantage to some SMT systems, which use the Maximum Entropy approach, is that they combine many knowledge sources and, therefore give a good basis for making use of multiple knowledge sources while analyzing a sentence for translation. In general, fully functional statistical machine translation systems exist and may be implemented as part of a hybrid system as defined herein. One example is presented in U.S. Pat. No. 5,991,710 where is incorporated by reference herein.

Rule-Based MT Module

A rule-based module, an Lexical Functional Grammar ("LFG") system (Shihadah & Roochnik, 1998) may be employed which is used to feed the hybrid machine translation engine. The LFG system contains a richly-annotated lexicon containing functional and semantic information. There are many examples of fully functional rule based machine translation modules and systems which may be used as part of the hybrid machine translation system described herein, including the one shown in U.S. Pat. No. 6,952,665 which is incorporated by reference herein.

Hybrid MT

In the hybrid machine translation (HMT) framework, the statistical search process may have full access to the information available in LFG lexical entries, grammatical rules, constituent structures and functional structures. This is accomplished by treating the pieces of information as feature functions in the Maximum Entropy algorithm of the hybrid machine translation engine shown in FIG. 1, which is also shown as the decoder in FIGS. 6A-C.

Incorporation of these knowledge sources both expand and constrain the search possibilities. Areas where the search is expanded include those in which the two languages differ significantly, as for example when a long-distance dependency exists in one language but not the other.

Statistical Machine Translation is traditionally represented in the literature as choosing the target (e.g., English) sentence with the highest probabil-ity given a source (e.g., French) sentence. Originally, and most-commonly, SMT uses the "noisy channel" or "source-channel" model adapted from speech recognition (Brown et. al., 1990; Brown et. al., 1993).

While most SMT systems used to be based on the traditional "noisy channel" approach, this is simply one method of composing a decision rule that determines the best translation. Other methods may be employed and many of them can even be combined if a direct translation model using a Maximum Entropy is employed.

Translation Models

The translation models introduced for the system which is described here in are a combination of statistically learned lexicons interpolated with a bilingual lexicon used in the rule-based LFG system.

Language Models

The use of lexical (syntactic and semantic) and grammatical models or feature functions in a statistical framework is introduced. The incorporation of rich lexical and structural data into SMT allows the application of linguistic analysis to SMT. To improve MT quality language model feature functions, the language model feature functions may cover standard 5-gram, POS-based 5-gram and time-synchronous CYK-type parser, as described in (Sawaf et. al., 2000). The m-gram language models (word and POS class-based) may be trained on a corpus, where morphological analysis is utilized.

Then a hybrid translation system is trained to translate the large training corpus in non-dialect language into the targeted dialect language. After that, the new "artificially" generated corpus is utilized to train the statistical language models. For the words, which do not have a translation into the target language, may be transliterated, using a transliteration engine, for example one based on the Grapheme-to-Phoneme converter like (Bisa-ni & Ney, 2002; Wei, 2004). Besides this corpus, the original text corpus is used for the training of the final language models.

Functional Models

The use of functional constraints for lexical information in source and target give a deeper syntactic and semantic analytic value to the translation. Functional constraints are multiple, and some of these functions are language dependent (e.g. gender, polarity, mood, etc.).

These functions can be cross-language or within a certain language. A cross-language function could be the tense information but also the function "human", describing that the concept to be generally a human being ("man", "woman", "president" are generally "human", but also potentially concepts like "manager", "caller", "driv-er", depending on the semantic and syntactic en-vironment).

A "within-language" function could be gender, as objects can have different genders in different languages (e.g. for the translation equivalents of "table", in English it has no gender, in German it is masculine, in French and Arabic it is feminine).

Translation of Standardized Foreign Languages into English

The translation from standardized languages (written text not from dialects as in chat, IM and email) into English is done using the above de-scribed system using lexical, functional and syn-tactical features which were used in a LFG based system. The statistical models are trained on a bilingual sentence aligned corpus for the translation model and the alignment template model. The language models (POS-based and word-based) are being trained on a monolingual corpus.

Translation of Dialect into English

Translation of foreign dialect may be implemented in one embodiment using a hybrid MT system that translates the dialect into the written standard of the foreign language first. For the presented translation system, a bilingual corpus is used which consists of sentences in the dialect and the standardized form for training the language models. Also feature functions built out of rules built to translate (or rather: convert) the dialect into non-dialect are used.

As much of the input can be either standardized or dialect at the same time, the quality of translation can be increased by using dialect feature functions for both the standardized and dialect variants and allow the Generative Iterative Scaling (GIS) algorithm to change the weighting of these features during the training process.

In addition to the challenge of dialects, are the nuances of various topical areas (domains) that present unique terms specific to those areas or commonly used terms with different meanings specific to those areas. For example, a text might report on the year's flu season and then a malicious attack spread by a hacker. Both topics might use the term "virus" with different meanings. The subsequent translation could be inaccurate with-out the proper understanding of the context of the term "virus" in each instance. The use of domain-specific information resolves this potential problem.

Domains and Micro-Dictionaries

Figure 6A:
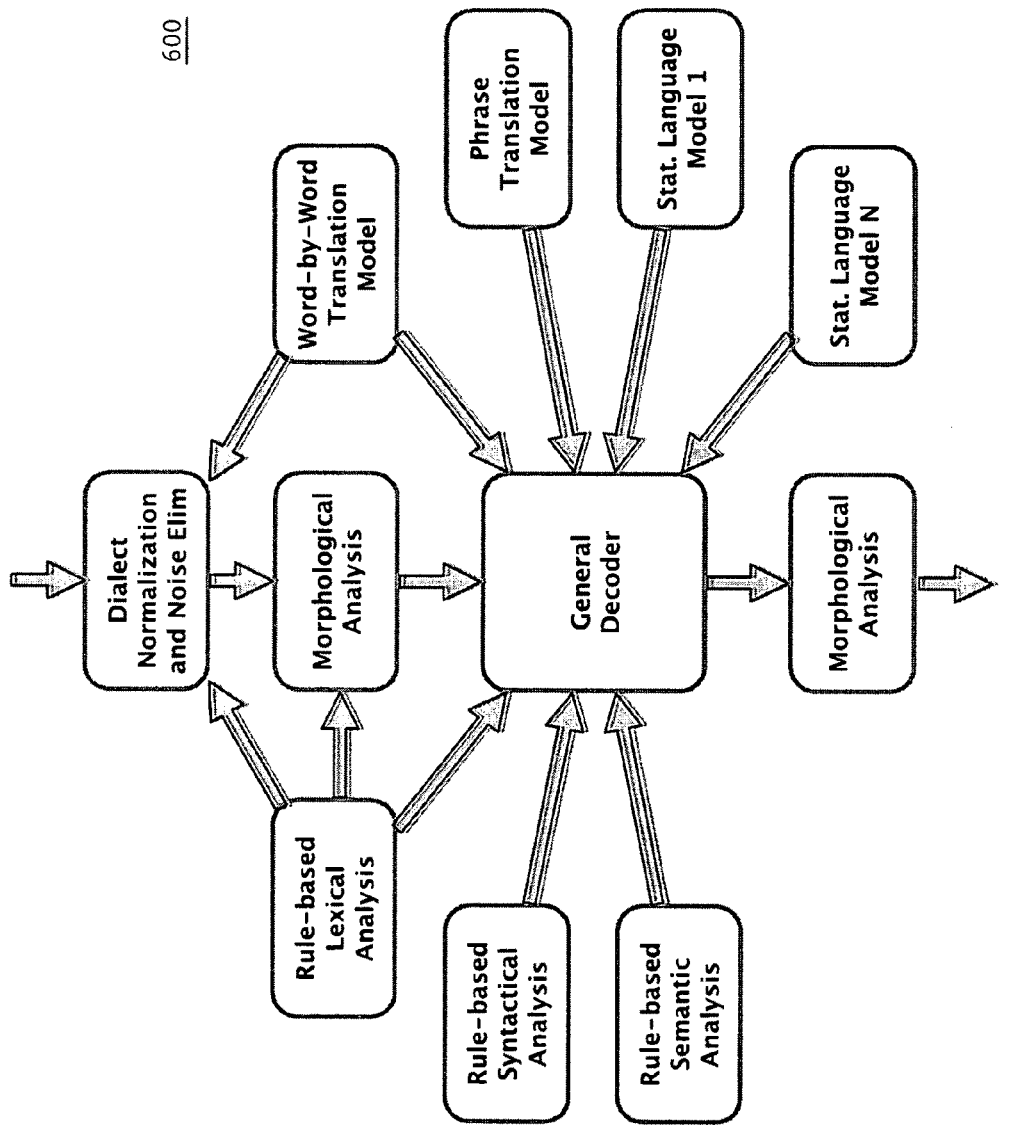
FIGS. 6A, 6B and 6C depict another view of a hybrid machine translation system according to an additional embodiment of the invention.
Figure 6B:
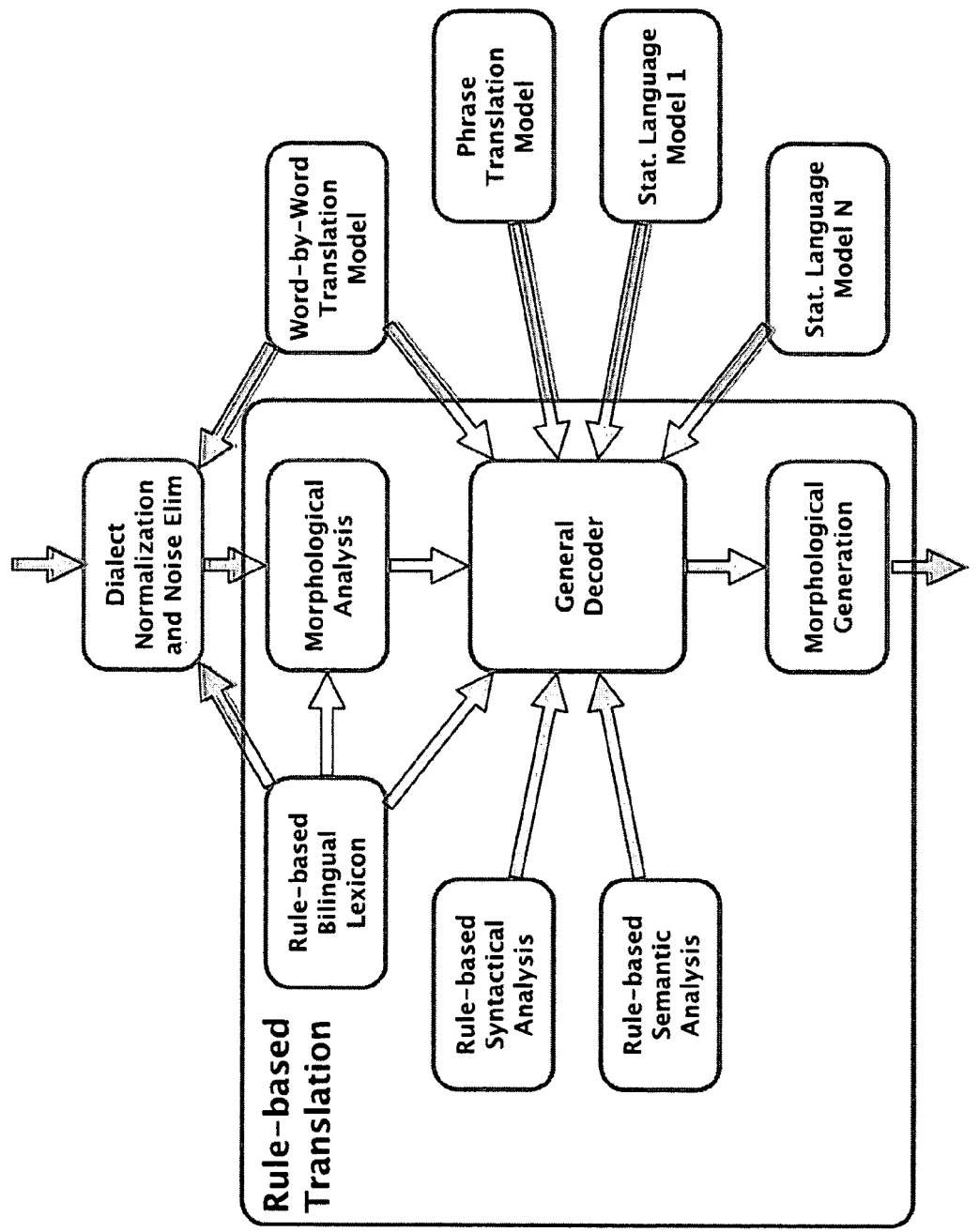
Figure 6C:
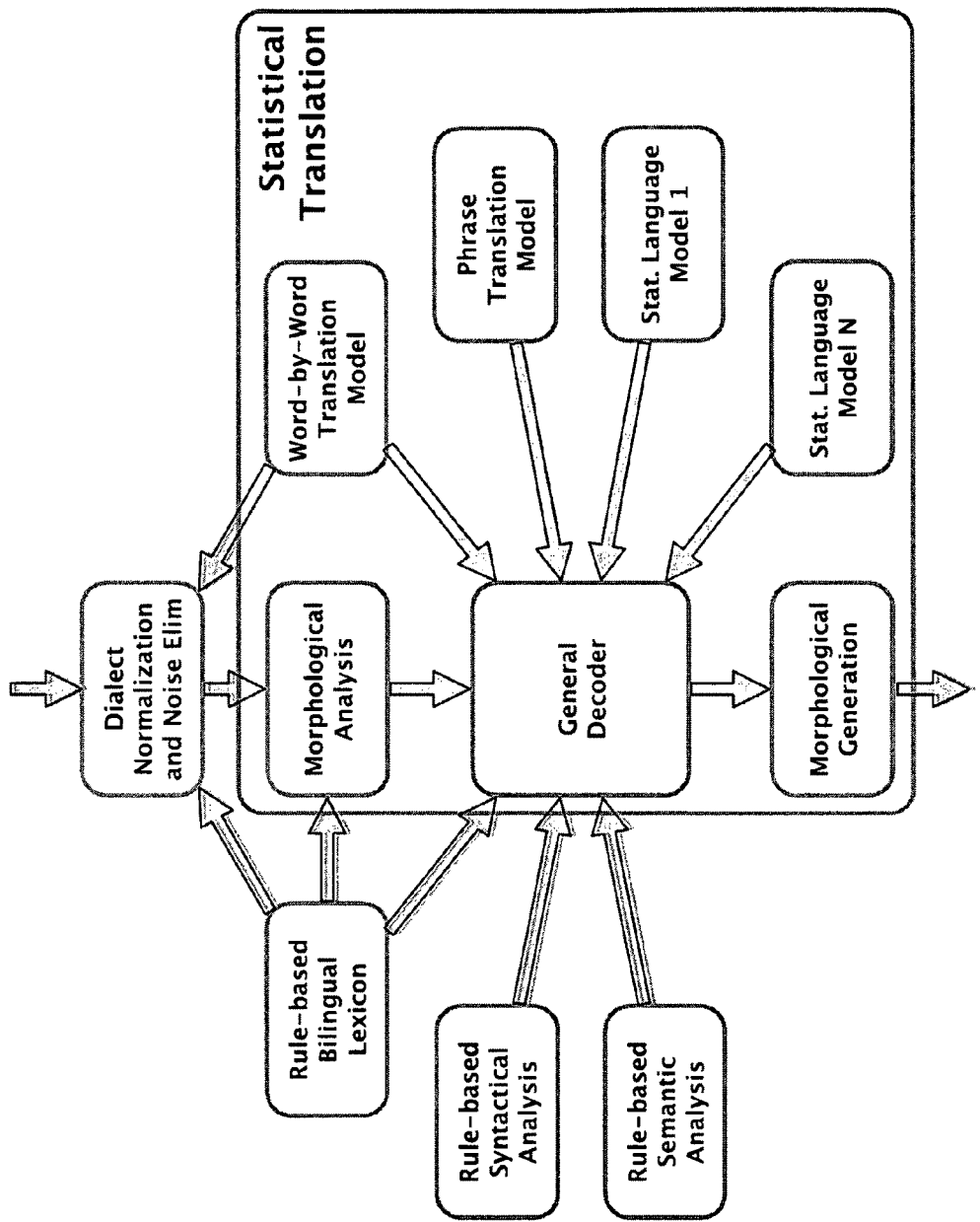

The introduction of special domain dictionaries is readily available. Multiple domain specific on-line dictionaries include, in addition to the general dictionary, for example the following micro-dictionaries:

Military;
Special Operations;
Mechanical;
Political & Diplomatic;
Nuclear;
Chemical;
Aviation;

Computer & Technology;
Medical;
Business & Economics;
Law Enforcement;
Drug terms FIGS. 6A, 6B and 6C depict other views of a hybrid machine translation system according to an embodiment of the invention. As is apparent from FIGS. 6A-6C, the different rule based and statistical components provide outputs to a decoder which may implement a maximum entropy algorithm and may take into account these weights when selecting the optimum translation.

Figure 4:
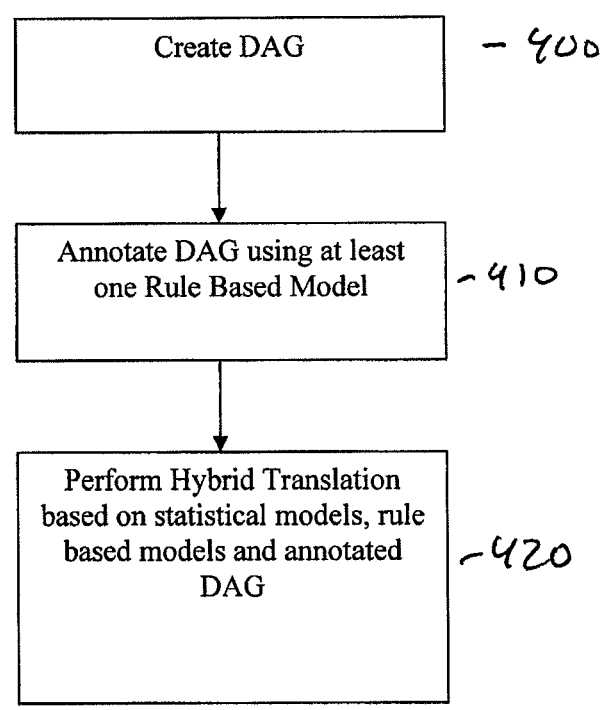
FIG. 4 depicts a method of annotating a DAG and performing a hybrid name translation based on the annotated DAG according to an embodiment of the invention.

FIG. 4 shows a process for creating an annotated DAG. Referring to FIG. 4, in step 400 a DAG is created. This may be performed either by a statistical machine translation module or a rule base machine translation module. In the next step, 410, rule based language models, such as lexical models comprising syntactic or semantic models, rules or constraints or functionalities are applied to or related to the DAG, or in other words are used to annotate the DAG. The result is that certain paths within the DAG are excluded or at least made more improbable. Finally, the annotated DAG is used in step 420 as a basis for translation by the hybrid machine translation engine using a maximum entropy model that receives the DAG as an input along with other inputs from statistical machine translation modules and rule based models, such as from the models shown in FIG. 1.

Figure 5:
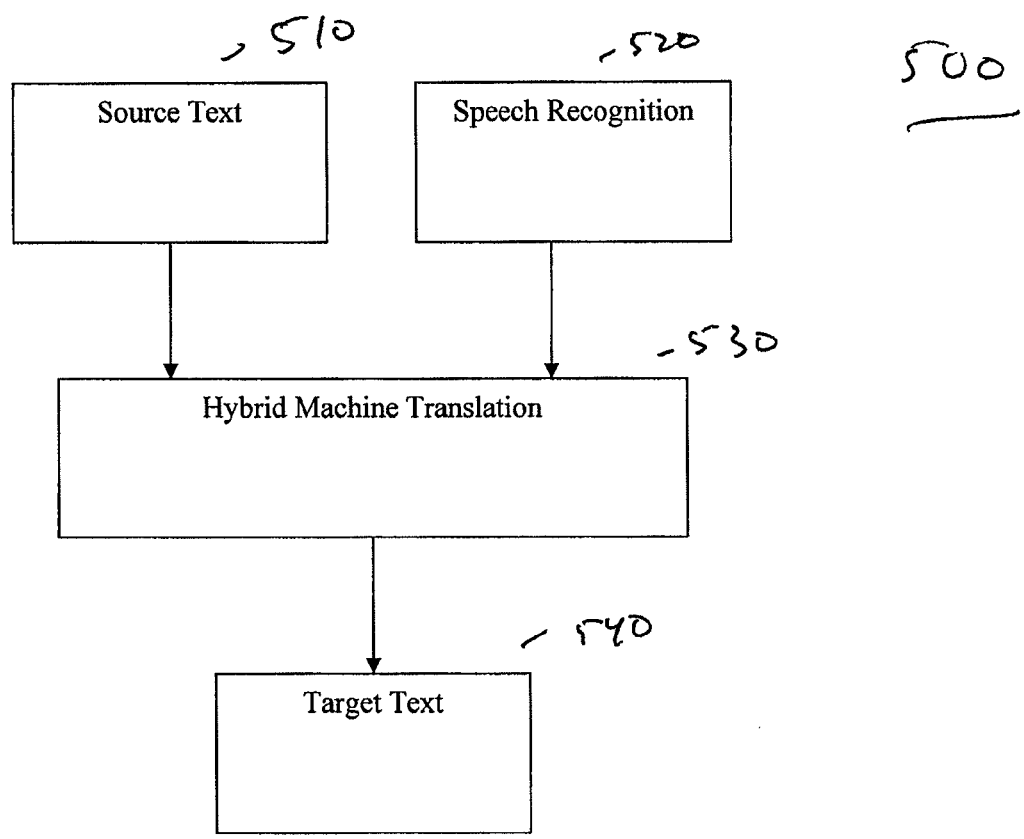
FIG. 5 depicts a method of performing hybrid machine translation on a text source and a source of text from speech recognition output according to an embodiment of the invention.

FIG. 5 shows a hybrid machine translation engine 500 according to an embodiment of the invention. It may be used to process source text 510 directly or to process lattices of text output from a speech recognition processor 520. A hybrid machine translation engine 530 may receive source text from both types of sources and produce target text in a different language according to the hybrid translation processes and systems as described herein to produce target text 540.

The processes described herein, and with reference to the Figures may all be implemented by a general purpose computer or server having a processor, a memory and input/output capabilities including any or all of a display, a keyboard, a network interface, a database interface. The network interfaces may be electrical, optical, wireless or any other suitable technology. And, there may be a single computer which performs the processes or multiple computers at different locations that share or pass data between and among themselves over a network, for example. The various models and data used by the language translation process including databases, the text, annotated text or recognized text processed may be stored in memory either locally on the computer in, for example, RAM or on a hard drive or other computer usable media, or may be stored on and be accessible over a network. The processes may also be implement using computer instructions that are stored in memory and executed by the computer processor to perform the steps and transform the input text or speech to translated text or speech.

While particular embodiments of the present invention have been shown and described, it will be understood by those having ordinary skill in the art that changes may be made to those embodiments without departing from the spirit and scope of the present invention.

What is claimed is:

1. A system for automatic translation, comprising:
at least one database for storing source and target text, rule based and statistical language models, and directed acyclic graphs (DAGS), wherein the rule based language models comprise syntactic, semantic and grammatical rule based models; and
a hybrid machine translation engine, having a maximum entropy algorithm that is coupled to the rule based language models and the statistical language models, the maximum entropy algorithm translating source text in one natural human language into target text in another natural human language based on the rule based language models, the statistical language models, and the DAGS;
wherein the hybrid machine translation engine is the only translation engine in the system.

2. The system according to claim 1, wherein the maximum entropy algorithm of the hybrid machine translation engine is configured to assign probabilities to different statistical language models and different rule based models.

3. The system according to claim 2, wherein the hybrid machine translation engine operates to perform translation of source text into target text based on available models.

4. The system according to claim 3, wherein the hybrid machine translation engine operates to perform translation of source text into target text when there are no rule based models available.

5. The system according to claim 1, wherein the DAGS are annotated based on the semantic rule based models.

6. A system for automatic translation of source text into target text, comprising:
at least one database for storing source and target text and directed acyclic graphs (DAGS) and semantic rules;
a statistical translation component that generates DAGS based on source text;
a rule based translation component that eliminates one or more paths from the DAGS based on the semantic rules; and
a hybrid machine translation engine that annotates the DAGS based on semantic rules and translates source text in one natural human language into target text in another natural human language based on at least the DAGS using a maximum entropy algorithm;
wherein the hybrid machine translation engine is the only translation engine in the system.

7. A method for machine translation comprising:
receiving and storing source text;
generating directed acyclic graphs (DAGS) based on statistical models;
eliminating one or more paths from the DAGS based on semantic rules; and
translating, by a hybrid machine translation engine, the source text in one natural human language into target text in another natural human language based at least in part on the DAGS using a maximum entropy algorithm;
wherein the hybrid machine translation engine is the only translation engine performing translating on the text.

8. The method according to claim 7, wherein the hybrid machine translation engine further receives weighted inputs from statistical and rule based translation models and performs the translating based on the weighted inputs.

9. The method according to claim 8, wherein the statistical models include a statistical lexicon model, a statistical phrase model and a statistical language model.

10. The method according to claim 8, wherein the rule based models include a rule based syntactic model, a rule based semantic model, a rule based grammatical model and a rule based transfer system model.

11. The method according to claim 7, wherein the hybrid machine translation engine further receives weighted inputs from at least four of: a statistical lexicon model, a statistical phrase model, a statistical language model, a rule based syntactic model, a rule based semantic model, a rule based grammatical model and a rule based transfer system model.

* * * * *